May 11, 1965   A. J. SMITH ETAL   3,182,933
AIRCRAFT CONTROL SYSTEMS
Original Filed Aug. 25, 1956   3 Sheets-Sheet 1
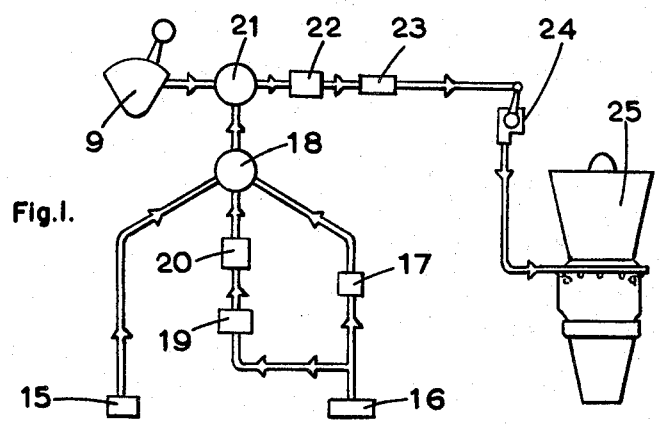
Fig.1.
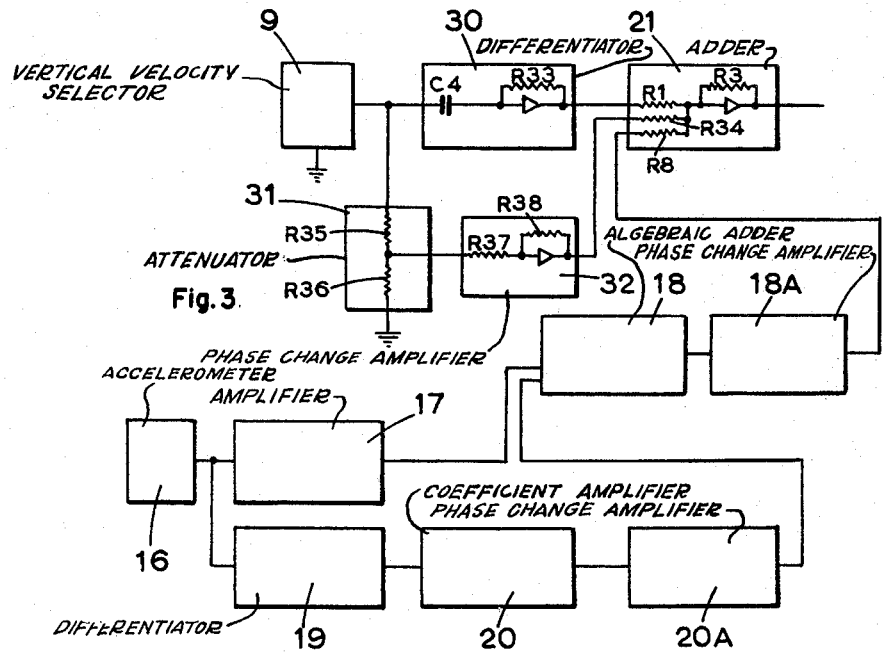
Inventors
Alfred John Smith
Eric Metcalf
by Fred E. Shoemaker &
Fred L. Witherspoon Jr.
Attorneys May 11, 1965 A. J. SMITH ETAL 3,182,933
AIRCRAFT CONTROL SYSTEMS
Original Filed Aug. 25, 1956 3 Sheets-Sheet 3

Inventors
Alfred John Smith
Eric Metcalf
by Fred E. Shoemaker +
Fred L. Witherspoon, Jr.
Attorneys United States Patent Office 3,182,933
Patented May 11, 1965

3,182,933
AIRCRAFT CONTROL SYSTEMS
Alfred John Smith and Eric Metcalf, Derby, England, assignors to Rolls-Royce Limited, Derby, England, a British company
Original application Aug. 25, 1956, Ser. No. 606,908, now Patent No. 3,030,053, dated Apr. 17, 1962. Divided and this application July 26, 1961, Ser. No. 127,041
9 Claims. (Cl. 244—77)

This application is a division of our co-pending application, Serial No. 606,908 for "Aircraft Control Systems" filed August 25, 1956, now U.S. Patent No. 3,030,053 of April 17, 1962.

This invention relates to control systems for aircraft and is particularly concerned with control systems for aircraft of the type on which a lift force exceeding the weight of the aircraft may be exerted independently of aerodynamic lift due to forward flight. Such an aircraft, which includes for example the type known as a jet lift aircraft, will be referred to as an aircraft of the type described.

It is an object of the present invention to provide a control system for an aircraft of the type described which facilitates control of the aircraft particularly under conditions of vertical landing and take-off and during hovering flight.

According to the present invention an automatic control system for an aircraft of the type described comprises means operable to select the vertical acceleration or the vertical velocity which it is desired that the aircraft shall have and adapted to produce a signal which is a measure of the desired quantity, vertical-acceleration-measuring means responsive to the vertical acceleration of the aircraft and adapted to produce a signal which is a measure of the quantity sensed, comparator means adapted to receive the signals from the selector means and from the means responsive to the quantity sensed and adapted to produce an output signal which is a measure of the difference between the two signals, means to amplify said output signal, actuator means operated by the amplifier signal, and vertical-thrust-varying means connected to the actuator means to be operated thereby to vary the vertical thrust acting on the aircraft, the arrangement being such that signals due to an increase in the selected upward vertical velocity or selected upward acceleration result in an increase of the vertical thrust, and that signals due to an increase in the actual upward vertical acceleration sensed result in a decrease of the vertical thrust.

Where the vertical thrust is produced by jet lift engines the thrust-varying means is conveniently a throttle valve controlling the supply of fuel to the engines.

In one arrangement according to this feature of the invention the means responsive to vertical velocity is a vertical velocity meter sensing directly the actual vertical velocity of the aircraft. In another arrangement the signal produced by the vertical-acceleration-measuring means is integrated and the resultant signal is used by a measure of vertical velocity.

In one arrangement according to this invention there may be provided a differentiating circuit connected to the acceleration-responsive means and having its output connected to adding means, the arrangement being such that signals from the differentiating circuit corresponding to an increasing upward acceleration result in a decrease of the vertical thrust.

It will be apparent that the control system in accordance with the invention is essentially a velocity control in that the pilot selects the vertical velocity, either upwards or downwards, which it is desired that the aircraft shall have, and this is automatically compared with the actual vertical velocity, the vertical thrust being increased if the actual upward velocity is less than the selected velocity and being decreased if it is greater. In addition, when a desired vertical velocity is selected the actual vertical velocity signal is preferably achieved from a signal representing the actual vertical acceleration, which is integrated to obtain the vertical velocity. The differential signals in each case may be considered as providing a measure of anticipation, so that overshooting of the selected value is reduced or avoided.

Preferably the signals produced by the vertical-acceleration-measuring means are in the form of electrical potentials which are directly proportional to the quantity which they represent at least over the operating range.

Thus the potential fed to the actuator will be a function of the selected vertical velocity minus the actual vertical velocity. The signal may in certain cases be modified by further time derivatives.

Each of the means producing a signal which is fed to the adding means will conveniently have incorporated means for amplifying the signal so arranged as to introduce into each signal the desired constants which determine the relative magnitude of the signals.

An example of this invention is illustrated in the accompanying drawings in which:

FIGURE 1 is a diagram of a control installation according to this invention,

FIGURE 3 is a circuit diagram of a further alternative arrangement, only the parts differing from the circuit of FIGURE 2 being shown.

Figure 2:
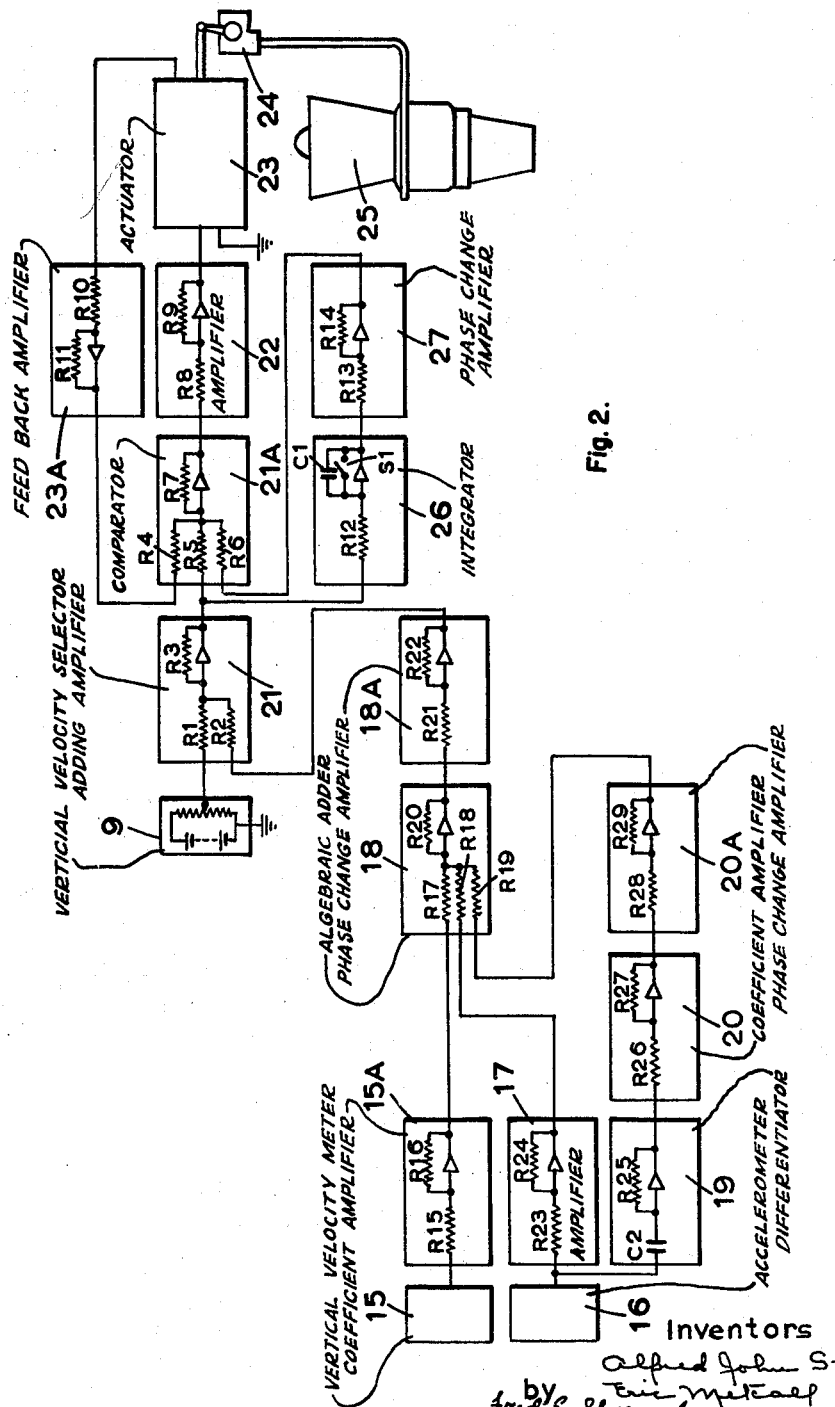
FIGURE 2 is a circuit diagram of the control illustrated in FIGURE 1.

In FIGURES 2 and 3 the parts are conventionally illustrated, the amplifying circuits being indicated by a triangle.

The invention will be described in relation to an aircraft having a number of jet lift engines which are disposed to product an upward thrust on the aircraft, and also having one or more propulsion engines which are disposed so as to exert a thrust on the aircraft in the direction of its normal flight.

It will be appreciated that the jet lift engines are started prior to take-off in normal operation and that, for the purpose of taking-off, the thrust of these engines is increased until it exceeds the weight of the aircraft. The latter then rises vertically into the air. When the aircraft is airborne a forward thrust may be provided by the propulsion engine or engines, and although these may be started prior to take-off they will normally be running at idling speed and thus developing little thrust during take-off. In certain cases the jet lift engines may have their axes inclined to the vertical, for example after the completion of the take-off in order to produce a forward component of thrust to assist the aircraft in climbing away.

During the landing procedure the jet lift engines will normally be started prior to landing, and may be inclined at an angle to the vertical to provide a reaward component of thrust while the aircraft approaches the landing ground. Before landing, the engines will be moved to the vertical position and the propulsion engine or engines will be shut down or reduced to idling speed so that they exert little thrust during the landing manoeuvre.

It will be appreciated that the automatic control system in accordance with the invention will facilitate control of the aircraft during take-off and landing, and also in hovering flight.

It may also be mentioned that the rate of fuel consumption of the jet lift engines is very high, because the engines must develop a thrust which will normally be substantially equal to the weight of the aircraft and are normally of comparatively simple design for the sake of lightness, since they are not used during cruising flight. It is therefore particularly desirable to provide a control system to enable the aircraft to be accurately positioned in relation to the ground during the landing and take-off manoeuvres, so as to reduce the time during which the jet lift engines are running to a minimum.

The control system of FIGURES 1 and 2 includes a vertical velocity selector 9 under the control of the pilot which produces a signal in the form of an electrical potential which is directly proportional to the vertical velocity selected. It may be arranged that the magnitude of this signal is limited in accordance with limitations on the permissible vertical velocity of the aircraft dictated, for example, by aerodynamic consideration.

The control system also comprises a vertical velocity meter or rate-of-climb meter 15 and this is arranged to produce an electrical potential which is directly proportional to the vertical velocity of the aircraft.

The output from velocity meter 15 is taken to resistance R15 of coefficient amplifier 15A containing also resistance R16 and then to resistance R17 of an adder 18 containing also resistance R20.

The control system further comprises an electrical accelerometer 16 (more particularly illustrated in FIGURE 4) arranged to measure the vertical acceleration of the aircraft, and arranged to produce an electrical potential directly proportional to the vertical acceleration. It is preferred that an independent accelerometer be used, but the acceleration signal might otherwise be obtained by differentiating the vertical velocity signal.

The output from the accelerometer 16 is fed to an amplifier 17 having resistances R23 and R24 and the amplified signal is fed to resistance R18 of adder 18. The output from the accelerometer 16 is also fed through capacitor C2 of a differentiator 19 having resistance R25 where it is differentiated with respect to time, thence through coefficient amplifier 20 (having resistances R26 and R27), phase-change amplifier 20A (having resistances R28 and R29) to resistance R19 of adder 18.

In adder 18 the outputs from the vertical velocity meter 15 and from the accelerometer 16, and also from the differentiating circuit 19, are added algebraically, that is to say, with regard to sign, the upward direction being conveniently considered as positive.

The output from the adder 18 is fed through a phase-change amplifier 18A (with resistances R21 and R22) to resistance R2 of an adding amplifier 21 containing also resistance R3. The signal which is representative of the required vertical velocity is fed from the velocity selector 9 to resistance R1 of adder 21. It will thus be appreciated that the output from the adder 21 may be written in the form $V1-(V_0+K1a_0+K2da_0)$, where V1 is the selected vertical velocity, $V_0$ the actual vertical velocity as measured by the vertical velocity meter 15, $a_0$ is the vertical acceleration measured by the accelerometer 16, and $da_0$ the differential of the vertical acceleration obtained from the differentiating circuit 19. This output is fed to resistance R5 of a comparator 21A containing also resistance R7 the output of which is fed to an amplifier 22 having resistances R8 and R9. The output from amplifier 22 is fed to the solenoid of an actuator device 23 connected to the throttle 24 of the lift engine or engines 25.

Actuator 23 contains a potentiometer (hereinafter described) the voltage output of which is fed back through resistance R10 of a feed-back amplifier 23A to resistance R4 of comparator 21A, to provide that the movement of the output member of the actuator is proportional to the input signal in well-known manner.

There is also provided an integrating device 26 having resistance R12 and capacitor C1 which is connected to the output side of the adder 21 and which integrates with respect to time the signal received from the adder. The integrated signal is fed to resistance R13 of phase-change amplifier 27 containing also resistance R14 and then to resistance R6 of comparator 21A. Thus the potential fed to the actuator 23 may be represented by one term which is a function of the required vertical velocity as modified by the actual velocity, acceleration and rate of change of acceleration, plus a second term which is a function of the integral of the first term with respect to time.

The object of the integrator 26 is to provide a long term reset action to eliminate errors in velocity caused by changes in weight of the aircraft, for example, due to consumption of fuel, which necessitate a change in the steady state throttle position. The integrator 26 ensures that the steady state velocity error will always be zero. To prevent build-up of the integrator output when the aircraft is on the ground, means such as switch S1 in integrator 26 is provided to short-circuit the capacitor C1.

In FIGURE 3 is illustrated an alternative form of control in which the demand for acceleration does not come directly from the velocity selector 9 but from the selector via a differentiator. This arrangement is basically the same as FIGURE 2 but the vertical velocity meter 15 and phase-change coefficient amplifier 15A are omitted, and differentiator 30 containing resistance R33 and capacitor C4 receives the signal from the velocity selector 9 and has its output taken to resistance R1 of adder 21. It will be appreciated that with this arrangement there will be an input to the adder 21 from the differentiator 30 only when the position of the selector is being changed (except as mentioned below). Thus the acceleration obtained will be related to rate of change of position of the selector 9. Since the vertical velocity of the aircraft is the integral of vertical acceleration it follows that the velocity will be related to the integral of the rate of change of position of the selector 9, that is directly to position.

The accelerometer 16 will most likely have a zero error which will mean that small acceleration demand will be present when the selector 9 is stationary. This would give rise to a constantly-changing velocity which would have to be corrected by continuous movement of the selector. To overcome this an attenuator 31 containing resistances R35 and R36 is connected to the selector 9 and the much attenuated output is taken to resistance R37 of phase-change amplifier 32 (containing also resistance R38) and then to resistance R34 of adder 21. The accelerometer error will thus be cancelled out at some indeterminate selector position.

Suggested values for the capacitances illustrated in FIGURES 2 and 3 indicated by the letter C are 1 microfarad, and for the resistances indicated by the letter R are 1 megohm, with the exception of the following:

Resistance: Megohms
R9 ------------------------------------- 10.00
R27 ------------------------------------ 0.25
R36 ------------------------------------ 0.025

It will be appreciated that these values depend on the characteristics of the engine 25 and the actuator 23.

Figure 4:
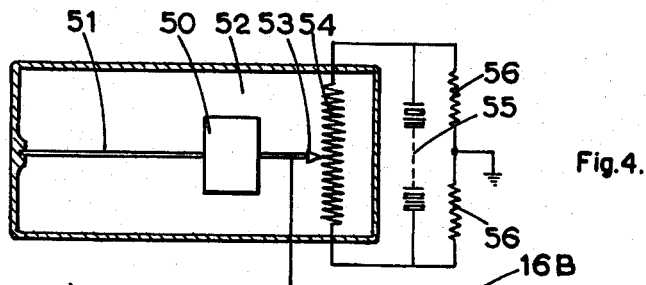
FIGURE 4 is a diagrammatic illustration of an accelerometer.

The vertical accelerometer 16 is diagrammatically illustrated in FIGURE 4. This comprises a weight 50 supported on a resilient centilever arm 51 in a chamber support structure 52. The end of the arm 51 is diagrammatically illustrated to comprise a potentiometer contact 53 operating on a potentiometer resistance 54. The circuit including the resistance 54 further comprises a voltage source 55 and network resistances 56. The output indicated at 16B is a measure of vertical acceleration. It will be understood that assuming the apparatus to be mounted in the aircraft horizontally, as shown, a vertical acceleration causes deflection of the cantilever arm 51, moving the potentiometer contact over the potentiometer resistance 54 to an extent which is dependent upon the value of the vertical acceleration. The movement of weight in the chamber 52 is preferably damped viscously, or alternatively by the well-known methods of eddy current damping.

Figure 5:
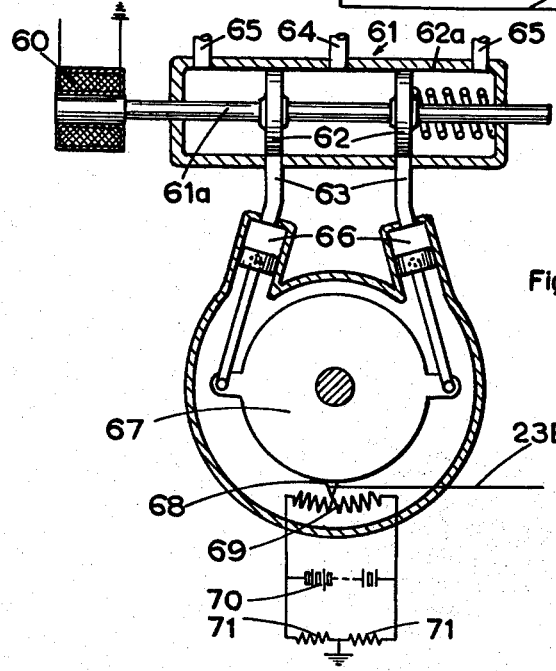
FIGURE 5 is a diagrammatic illustration of a throttle control.

The actuator device 23 is illustrated in FIGURE 5 having a magnetic relay 60 to which the potential derived from the amplifier 22 is applied and connected to operate a piston-type valve 61. The valve comprises a rod 61a having a pair of lands 62 co-operating with the bore of a sleeve 62a so that, in the equilibrium position, the lands cover outlet holes 63 formed in the sleeve. Oil or other suitable fluid is supplied under pressure through an inlet port 64 in the sleeve midway between the two outlet holes, and drain ports 65 are formed in the sleeve on the sides of the respective outlet ports remote from the inlet port. Thus, on movement of the piston valve in one sense one outlet port is connected through the inlet port to the source of pressure and the other is connected to a drain port, and on movement in the opposite sense the second outlet port is connected to the pressure port and the first to the drain port. The outlet ports are connected to a pair of pressure spaces 66 of a hydraulic motor which is of the semi-rotary type, and so arranged that the application of pressure in one space causes rotation in one direction and the application of pressure in the other space causes rotation in the other direction. The rotating part 67 of the motor is connected to the throttle valve 24 controlling the fuel supply to the combustion equipment of the lift engines.

The rotating part carries a potentiometer contact 68 co-operating with a potentiometer resistance 69 connected in a circuit including a voltage source 70 and network resistances 71. The output from the potentiometer circuit is shown at 23B and is fed back to the comparator 21A of FIGURES 2 and 3.

There may be provided in addition a manually-controllable throttle lever which may be connected to the throttle valve, and it will be arranged that this lever is capable of overriding the automatic control; for example the actuator device may be declutched as the manual control is operated.

The automatic control system just described works as follows: Let it be assumed that the vertical velocity selected by means of device 9 has suddenly been increased by 10 feet/sec. at zero time. Then assuming that the aircraft was previously travelling at the vertical velocity selected, the difference between the selected vertical velocity and the actual vertical velocity is 10 feet/sec. and an electrical potential proportional to this difference will be fed by the adder circuit 21 to the associated amplifier 22 where the signal is amplified in a predetermined ratio. This signal is passed to the actuator 23 and causes the throttle 24 to be opened so that the engine speed increases and a greater upward thrust acts on the aircraft. It will be appreciated that as the aircraft approaches the selected vertical velocity the signal, which is proportional to the difference between the selected vertical velocity and the actual vertical velocity, dies away.

As the aircraft rises a signal proportional to its vertical acceleration will be produced by the vertical acceleration meter 16 and this signal is also fed to the actuator 23 but acts in the sense to reduce the thrust. Thus, before the selected vertical velocity is attained, the signal from the vertical acceleration meter 16 will become equal to the signal representing the difference between the required vertical velocity and the actual vertical velocity and the potential fed to the actuator will thus tend to cause the throttle valve 24 to be moved to its equilibrium position. As the signal representing the vertical acceleration exceeds the signal representing the difference between the required vertical velocity and the actual vertical velocity, the thrust will tend to be reduced and the aircraft while still accelerating upwards will tend to decrease its rate of acceleration until it attains the selected vertical velocity, which, of course, should be achieved with no vertical acceleration.

Superimposed on the potential representing the actual acceleration is a further potential obtained from the differentiating circuit 19 and representing the rate of change of vertical acceleration of the aircraft, and like the signal representing the vertical acceleration this is also in opposition to the signal representing the difference between the required vertical velocity and the actual vertical velocity. Thus the greater the rate of change of upward acceleration of the aircraft at a given actual vertical upward acceleration, the sooner will the combined signal become equal to the signal representing the difference between the required vertical velocity and the actual vertical velocity and the sooner will the actuator 23 be caused to move the throttle 24 to decrease the thrust. The signal produced by the differentiating circuit 19 may therefore be best described as an anticipatory measure of the acceleration.

The thrust developed by the engine 25 lags behind the movement of the throttle 24 and it will be appreciated that if the mass of the aircraft is assumed to be constant a change in the thrust from the value required to overcome the gravitational acceleration on the aircraft represents a directly proportional upward or downward acceleration of the aircraft. Thus, in this example, the thrust first of all increases and then decreases to somewhat below its equilibrium value, causing a corresponding upward acceleration of the aircraft followed by a decrease in upward acceleration and a slight downward acceleration as the aircraft tends to achieve the selected vertical velocity.

In the modification in which the vertical-velocity-measuring means 15 is omitted, and the selector 9 is arranged to select a desired value of the vertical acceleration, it will be appreciated that the effect is similar to selecting the thrust directly, but has the advantage that in the automatic control in accordance with the invention the signal calling for, for example, an increased upward acceleration is cancelled by the signal from the accelerometer 16 when the desired increased upward acceleration is reached, irrespective of external aerodynamic influences. In addition in this embodiment the differentiating circuit 19 gives an anticipatory measure of the actual value of the acceleration.

It will be appreciated that with the systems described above, the equilibrium throttle position will always be directly related to the difference between the selected value of the velocity or acceleration and the actual value of the respective quantity; thus if the aircraft is hovering and, for example, heavy cargo is off-loaded the aircraft will tend to rise because the thrust is now greater than the weight and as the selected value of the vertical velocity (or acceleration) is unaltered the throttle will remain in the same position. As described above, an integrating device is incorporated and it is arranged that in addition to the signal which is a function of the required vertical velocity as modified by the actual vertical velocity and by the acceleration of the aircraft, there is also produced a signal which is proportional to the integral of this signal with respect to time. The sum of the original signal and its integral is fed to the actuator. When the aircraft tends to rise or descend after an alteration of weight due for example to off-loading cargo, the difference between the selected value of the velocity (or acceleration) and the actual value becomes no longer equal to zero and the signal due to the integral increases continuously from the time of the alteration of weight. The total signal is therefore fed to the actuator in the sense to reduce the engine thrust; in the example given, the magnitude of the difference between the selected value and the actual value which is required to feed the necessary thrust-decreasing signal to the throttle is continuously reduced until it reaches zero, corresponding to the aircraft having been restored to the value it started from.

We claim:

1. An automatic control system for an aircraft of the type having means to exert a vertical lift thrust exceeding the weight of the aircraft independently of aerodynamic lift due to forward flight which comprises means operable to select the vertical acceleration which it is desired that the aircraft shall have and adapted to produce an electric signal which is a measure of the desired acceleration, means responsive to the vertical acceleration of the aircraft and adapted to produce an electric signal which is a measure of the quantity sensed, adder means adapted to receive the signals from the selector means and from the means responsive to the quantity sensed and adapted to produce an output electric signal which is a measure of the difference between the two signals, means to amplify said output signal, actuator means operated by the amplified signal, and vertical-thrust-varying means connected to the actuator means to be operated thereby to vary the vertical lift thrust of the thrust exerting means acting on the aircraft, the arrangement being such that signals due to an increase in the selected upward vertical acceleration result in an increase of the vertical thrust, and that signals due to an increase in the actual upward vertical acceleration sensed result in a decrease of the vertical thrust.

2. A control system as claimed in claim 1 in which a portion of the signal which is a measure of the acceleration is differentiated, changed in phase and combined with the remainder of the signal before being taken to the adding means.

3. A control system as claimed in claim 1 in which the actual vertical acceleration signal is supplemented prior to delivery to said adder by a signal obtained as the differential of the vertical acceleration.

4. In an automatic control system for an aircraft having means thereon arranged to exert vertical lift thrust exceeding the weight of the aircraft independent of aerodynamic lift due to forward flight, which comprises means to select the vertical velocity which it is desired the aircraft shall have and adapted to produce an electric signal which is a measure of the desired vertical velocity, means responsive to the output of said first means to produce its differential which is a measure of the desired vertical acceleration, means responsive to the vertical acceleration of the aircraft adapted to produce an electric signal which is a measure of the quantity sensed, means to feed a portion of said last mentioned signal to a differentiator and then to phase change amplifier means to combine the output of said amplifier with the balance of said last mentioned signal, means to add the said combination signal to the output signal of said first differentiating means, means to amplify the added signals, actuator means operated by the amplified signal, and vertical thrust-varying means connected to the actuator means to be operated thereby to vary the vertical lift thrust of the thrust exerting means acting on the aircraft, the arrangement being such that signals due to an increase in the selected upward acceleration result in an increase in the vertical thrust, and that signals due to an increase in the actual upward acceleration sensed result in a decrease in the vertical thrust.

5. An automatic control system for an aircraft having means to exert a vertical lift thrust exceeding the weight of the aircraft independently of aerodynamic lift due to forward flight, which comprises means operable to select the vertical velocity which it is desired that the aircraft shall have and adapted to produce an electric signal which is a measure of the desired velocity, means responsive to the vertical velocity of the aircraft and adapted to produce an electric signal which is a measure of the quantity sensed, means responsive to the vertical acceleration of the aircraft and adapted to produce an electric signal which is a measure of the vertical acceleration sensed, means to algebraically add the sensed signals, means to add the selected signal to said added sensed signals to obtain a resultant signal, and actuator means operated by the resultant signal, said actuator means being in control of said means to exert a vertical lift thrust to regulate the thrust thereof to compensate for any difference in selected and actual velocities.

6. The automatic control system in claim 5 in which the added selected and sensed signals are further augmented by a feed-back signal, means dependent on the position of said actuator determining the measure of said feed-back signal, said feed-back signal responsive to movement of the output member of the actuator proportional to the signal input thereto.

7. The automatic control system of claim 1 in which the added selected and sensed electric signals are augmented by an amplified feed-back signal, means dependent on the position of said actuator determining the measure of the feed-back signal, said feed-back signal responsive to movement of the output member of the actuator proportional to the signal input thereto.

8. The automatic control system of claim 7 in which a portion of the added and selected signal addition is changed in phase and integrated, and means to combine the integrated portion with the remainder of said feed-back signal to provide a long term reset action.

9. An automatic control system for an aircraft of the type having means to exert a vertical lift thrust exceeding the weight of the aircraft independently of aerodynamic lift due to forward flight which comprises means operable to select the vertical velocity which it is desired that the aircraft shall have and adapted to produce an electric signal which is a measure of the desired velocity, means responsive to the vertical acceleration of the aircraft and adapted to produce electric signals which are a measure of the quantity sensed, an amplifier for a portion of the output of said accelerometer, a differentiator for the remainder of the accelerometer output, a coefficient amplifier and a phase change amplifier for the differentiated signal, algebraic adder means adapted to receive the acceleration signals from the selector means, the amplified signal from the accelerometer, and the signal from the series arrangement differentiator, coefficient amplifier and phase change amplifier, vertical-thrust-varying means adjustable to vary the vertical lift thrust of the thrust exerting means acting on the aircraft, actuator means connected to the thrust varying means, means dependent on the position of the actuator means to produce a feed-back electric signal representative of position, and comparator means combining said last-mentioned signal and the signal from the said adder means to energize said actuator means.

References Cited by the Examiner
UNITED STATES PATENTS 2,650,046    8/53    Vanderlip            244—17.13
2,830,291    4/58    Hecht et al.          244—77

FERGUS S. MIDDLETON, *Primary Examiner.*